United States Patent
Kawai (10) Patent No.: US 8,316,391 B2
(45) Date of Patent: Nov. 20, 2012

(54) VIDEO SIGNAL PROCESSING APPARATUS AND SET TOP BOX

(75) Inventor: Masanori Kawai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 331 days.

(21) Appl. No.: 12/820,493

(22) Filed: Jun. 22, 2010

(65) Prior Publication Data

US 2010/0325651 A1 Dec. 23, 2010

(30) Foreign Application Priority Data

Jun. 23, 2009 (JP) .................. 2009-148340

(51) Int. Cl.
*H04N 7/16* (2011.01)
*H04N 7/173* (2011.01)

(52) U.S. Cl. ............ 725/25; 725/78; 725/131; 725/133; 725/139; 725/141; 725/151; 725/153

(58) Field of Classification Search .................. 725/25, 725/131, 133, 139, 141, 151, 153; 348/441
See application file for complete search history.

(56) References Cited

U.S. PATENT DOCUMENTS

| | | | |
|---|---|---|---|
| 7,512,611 B2 * | 3/2009 | Yoshizawa | 1/1 |
| 7,739,745 B2 | 6/2010 | Ishimatsu et al. | |
| 2005/0268323 A1 | 12/2005 | Yamaguchi et al. | |
| 2006/0208929 A1 * | 9/2006 | Cho | 341/50 |
| 2006/0274203 A1 | 12/2006 | Naganuma et al. | |
| 2007/0133673 A1 * | 6/2007 | Imaizumi | 375/240 |
| 2007/0154173 A1 * | 7/2007 | Kim et al. | 386/83 |
| 2008/0037948 A1 * | 2/2008 | Yahata | 386/46 |
| 2009/0040327 A1 * | 2/2009 | Ono et al. | 348/222.1 |
| 2009/0263102 A1 * | 10/2009 | Shimada et al. | 386/94 |

FOREIGN PATENT DOCUMENTS

| | | |
|---|---|---|
| JP | 2003-224816 A | 8/2003 |
| JP | 2004-336576 A | 11/2004 |
| JP | 2006-108961 A | 4/2006 |
| JP | 2006-319502 A | 11/2006 |
| JP | 2007-12188 A | 1/2007 |
| WO | WO 2007/122826 A1 | 11/2007 |

* cited by examiner

*Primary Examiner* — An Son P Huynh
(74) *Attorney, Agent, or Firm* — Crowell & Moring LLP (57) ABSTRACT

This video signal processing apparatus includes a first resolution conversion portion, a first analog video output portion, a digital video output portion and a control portion. The control portion is so formed as to make the first resolution conversion portion convert a video signal to a digital video signal of high definition and make the digital video output portion output the digital video signal of the high definition when recognizing that connection between the digital video output portion and a display is in an on-state, also in a case where a broadcast signal includes a signal for restricting output of the video signal of the high definition.

15 Claims, 4 Drawing Sheets

| CCI Bits # | 7 | 6 | 5 | 4 | 3 | 2 | 1 | 0 |
|---|---|---|---|---|---|---|---|---|
| Card sets to | 0 | 0 | 0 | CIT | APS1 | APS0 | EMI1 | EMI0 |
| Host interprets as | rsvd | rsvd | rsvd | CIT | APS1 | APS0 | EMI1 | EMI0 |

FIG.3

| CIT | Description |
|---|---|
| 0b (INEFFECTIVE) | No Image Constraint asserted |
| 1b (EFFECTIVE) | Image Constraint required |

VIDEO SIGNAL PROCESSING APPARATUS AND SET TOP BOX

BACKGROUND OF THE INVENTION

1. Field of the Invention

The present invention relates to a video signal processing apparatus and a set top box, and more particularly, it relates to a video signal processing apparatus and a set top box comprising a resolution conversion portion capable of converting a resolution.

2. Description of the Background Art

An STB (Set Top Box) and a video signal processing apparatus such as a DVD player, comprising a resolution conversion portion capable of converting a resolution are known in general, as disclosed in Japanese Patent Laying-Open No. 2006-319502, for example.

The aforementioned Japanese Patent Laying-Open No. 2006-319502 discloses a recording and reproducing unit (video signal processing apparatus) comprising a picture frame converting unit (resolution conversion portion) capable of converting a resolution, an analog video output terminal capable of outputting a converted analog video signal to a television receiver (display) and an HDMI® terminal (digital video output portion) capable of outputting a digital video signal to the television receiver. The recording and reproducing unit according to the aforementioned Japanese Patent Laying-Open No. 2006-319502 is so formed as to be capable of outputting the digital and analog video signals having a common resolution converted by the picture frame converting unit from both the analog video output terminal and the HDMI® terminal. In other words, this recording and reproducing unit is so formed as to be capable of simultaneously outputting the digital and analog video signals of high definition from both the analog video output terminal and the HDMI® terminal regardless of the existence/absence of copy restriction of the video signals.

However, the recording and reproducing unit (video signal processing apparatus) disclosed in the aforementioned Japanese Patent Laying-Open No. 2006-319502 is so formed as to be capable of simultaneously outputting the digital and analog video signals of high definition from both the analog video output terminal and the HDMI® terminal (digital video output portion), and hence the analog video signal of high definition is disadvantageously output also from the analog video output terminal where unauthorized copying is hardly restricted. Thus, the analog video signal of high definition output from the analog video output terminal where copying is hardly restricted may be copied by a user. On the other hand, analog and digital video signals of low definition are output from the analog video terminal and the HDMI® terminal (digital video output portion) when the analog and digital video signals of low definition are forced to be output in order to restrict unauthorized copying of the video signals of high definition, for example, and hence a user may be disadvantageously unable to watch an image of high definition.

SUMMARY OF THE INVENTION

The present invention has been proposed in order to solve the aforementioned problems, and an object of the present invention is to provide a video signal processing apparatus and a set top box enabling a user to watch a digital image of high definition while suppressing copying of a video signal of high definition.

In order to attain the aforementioned object, a video signal processing apparatus according to a first aspect of the present invention comprises a first resolution conversion portion capable of converting a resolution of a video signal based on a broadcast signal to both low definition and high definition, a first analog video output portion connected to the first resolution conversion portion, capable of outputting an analog video signal, a resolution of which is converted by the first resolution conversion portion, to a display, a digital video output portion connected to the first resolution conversion portion, capable of outputting a digital video signal, a resolution of which is converted by the first resolution conversion portion, to the display and a control portion capable of recognizing whether or not connection between the digital video output portion and the display is in an on-state, wherein the control portion is so formed as to be capable of making the first resolution conversion portion convert the video signal to the digital video signal of the high definition and making the digital video output portion output the digital video signal of the high definition when recognizing that the connection between the digital video output portion and the display is in an on-state, also in a case where the broadcast signal includes a signal for restricting output of the video signal of the high definition.

In this video signal processing apparatus according to the first aspect, as hereinabove described, the control portion is so formed as to be capable of making the first resolution conversion portion convert the video signal to the digital video signal of the high definition and making the digital video output portion output the digital video signal of the high definition when recognizing that the connection between the digital video output portion and the display is in an on-state, also in a case where the broadcast signal includes the signal for restricting output of the video signal of the high definition, whereby the digital video signal of the high definition can be output from the digital video output portion also when output of the video signal of the high definition is restricted. Thus, an image of the high definition can be watched on the display. When the broadcast signal includes a signal for restricting output of the analog video signal of the high definition from the first analog video output portion, the analog video signal of the high definition is not output from the first analog video output portion so that copying of the analog video signal of the high definition through the first analog video output portion can be suppressed. Thus, a user can watch a digital image of the high definition while copying of the video signal of the high definition is suppressed.

In the aforementioned video signal processing apparatus according to the first aspect, the control portion is preferably so formed as to be capable of determining whether or not a copyright protection function preventing unauthorized copying of the digital video signal of the high definition, the resolution of which is converted by the first resolution conversion portion, is effective and is preferably so formed as to make the digital video output portion output the digital video signal of the high definition also in a case where the broadcast signal includes the signal for restricting output of the video signal of the high definition, when determining that the copyright protection function is effective. According to this structure, the digital video signal of the high definition can be output from the digital video output portion only when the control portion recognizes that the copyright protection function preventing unauthorized copying of the digital video signal of the high definition is effective, and hence unauthorized copying of the digital video signal of the high definition through the digital video output portion can be suppressed.

In the aforementioned video signal processing apparatus according to the first aspect, the control portion is preferably so formed as to be capable of determining whether or not a copyright protection function preventing unauthorized copying of the digital video signal of the high definition, the resolution of which is converted by the first resolution conversion portion, is effective and is preferably so formed as to stop output of the analog video signal from the first analog video output portion when determining that the copyright protection function is effective. According to this structure, unauthorized copying of the analog video signal of the high definition through the first analog video output portion can be easily suppressed while a user watches an image based on the digital video signal of the high definition.

In the aforementioned video signal processing apparatus according to the first aspect, the control portion is preferably so formed as to be capable of determining whether or not a copyright protection function preventing unauthorized copying of the digital video signal of the high definition, the resolution of which is converted by the first resolution conversion portion, is effective, and is preferably so formed as to make the digital video output portion output the digital video signal of the low definition having a lower resolution than the video signal of the high definition, the resolution of which is converted by the first resolution conversion portion while being so formed as to be capable of making the first analog video output portion output the analog video signal of the low definition when determining that the copyright protection function is not effective. According to this structure, when the broadcast signal includes the video signal of the high definition and the copyright protection function for the digital video signal is not effective, the video signal of the high definition is not output from either the digital video output portion or the first analog video output portion so that unauthorized copying of the video signal of the high definition through the digital video output portion and the first analog video output portion can be suppressed.

In the aforementioned video signal processing apparatus according to the first aspect, the resolutions of the analog video signal output from the first analog video output portion and the digital video signal output from the digital video output portion are preferably converted by the single first resolution conversion portion. According to this structure, the number of first resolution conversion portions can be reduced, and hence a circuit structure can be simplified, as compared with a case where resolutions of the video signals output from the first analog video output portion and the digital video output portion are converted individually by two first resolution conversion portions.

In the aforementioned video signal processing apparatus according to the first aspect, the signal for restricting output of the video signal of the high definition is preferably included in the broadcast signal transmitted from a cable television station. According to this structure, output of a transmission signal transmitted from the cable television station in the form of a video signal of the high definition is restricted so that unauthorized copying of the transmission signal transmitted from the cable television station in the form of a video signal of the high definition can be suppressed.

In the aforementioned video signal processing apparatus according to the first aspect, the first resolution conversion portion is preferably so formed as to selectively convert the resolution of the video signal to either the low definition or the high definition. According to this structure, the first resolution conversion portion selectively converts the resolution of the video signal to either the low definition or the high definition thereby not simultaneously converting the resolution to both the low definition and the high definition. Thus, a load applied to the first resolution conversion portion in converting the resolution can be reduced.

In the aforementioned video signal processing apparatus according to the first aspect, the digital video output portion preferably includes an HDMI connection portion capable of transmitting a signal encrypted by a copyright protection function preventing unauthorized copying of the digital video signal of the high definition between the display and the digital video output portion when the broadcast signal includes the signal for restricting output of the video signal of the high definition and the copyright protection function is effective. According to this structure, copyright of content can be reliably protected by the HDMI connection portion capable of transmitting the signal encrypted by the copyright protection function between the display and the digital video output portion when the broadcast signal includes the signal restricting output of the video signal of the high definition, so that unauthorized copying of the video signal in the form of a video signal of the high definition can be suppressed.

The aforementioned video signal processing apparatus according to the first aspect preferably further comprises a second resolution conversion portion capable of converting the resolution of the video signal based on the broadcast signal to the low definition not to the high definition. According to this structure, the second resolution conversion portion can convert the resolution of the video signal to the low definition independently of the first resolution conversion portion also when the first resolution conversion portion converts the resolution of the video signal to the high definition.

The aforementioned video signal processing apparatus according to the first aspect preferably further comprises a second analog video output portion connected to the second resolution conversion portion, capable of outputting an analog video signal, a resolution of which is converted to the low definition by the second resolution conversion portion, to the display. According to this structure, the analog video signal can be output from the second analog video output portion independently of the first analog video output portion also when the analog video signal is output from the first analog video output portion.

A set top box according to a second aspect of the present invention comprises a first resolution conversion portion capable of converting a resolution of a video signal based on a broadcast signal transmitted from a cable television station to both low definition and high definition on the basis of the broadcast signal, a first analog video output portion connected to the first resolution conversion portion, capable of outputting an analog video signal, a resolution of which is converted by the first resolution conversion portion, to a display, a digital video output portion connected to the first resolution conversion portion, capable of outputting a digital video signal, a resolution of which is converted by the first resolution conversion portion, to the display and a control portion capable of recognizing whether or not connection between the digital video output portion and the display is in an on-state, wherein the control portion is so formed as to be capable of making the first resolution conversion portion convert the video signal to the digital video signal of the high definition and making the digital video output portion output the digital video signal of the high definition when recognizing that the connection between the digital video output portion and the display is in an on-state, also in a case where the broadcast signal includes a signal for restricting output of the video signal of the high definition.

In the set top box according to the second aspect of the present invention, as hereinabove described, the control portion is so formed as to be capable of making the first resolution conversion portion convert the video signal to the digital video signal of the high definition and making the digital video output portion output the digital video signal of the high definition when recognizing that the connection between the digital video output portion and the display is in an on-state, also in a case where the broadcast signal transmitted from the cable television station includes the signal for restricting output of the video signal of the high definition, whereby the digital video signal of the high definition can be output from the digital video output portion also when output of the video signal of the high definition is restricted. Thus, an image of the high definition can be watched on the display. When the broadcast signal transmitted from the cable television station includes a signal for restricting output of the analog video signal of the high definition from the first analog video output portion, the analog video signal of the high definition is not output from the first analog video output portion so that copying of the analog video signal of the high definition through the first analog video output portion can be suppressed. Thus, a user can watch a digital image of the high definition while copying of the video signal of the high definition is suppressed.

In the aforementioned set top box according to the second aspect, the control portion is preferably so formed as to be capable of determining whether or not a copyright protection function preventing unauthorized copying of the digital video signal of the high definition, the resolution of which is converted by the first resolution conversion portion, is effective and is preferably so formed as to make the digital video output portion output the digital video signal of the high definition also in a case where the broadcast signal includes the signal for restricting output of the video signal of the high definition, when determining that the copyright protection function is effective. According to this structure, the digital video signal of the high definition can be output from the digital video output portion only when the control portion recognizes that the copyright protection function preventing unauthorized copying of the digital video signal of the high definition is effective, and hence unauthorized copying of the digital video signal of the high definition through the digital video output portion can be suppressed.

In the aforementioned set top box according to the second aspect, the control portion is preferably so formed as to be capable of determining whether or not a copyright protection function preventing unauthorized copying of the digital video signal of the high definition, the resolution of which is converted by the first resolution conversion portion, is effective and is preferably so formed as to stop output of the analog video signal from the first analog video output portion when determining that the copyright protection function is effective. According to this structure, unauthorized copying of the analog video signal of the high definition through the first analog video output portion can be easily suppressed while a user watches an image based on the digital video signal of the high definition.

In the aforementioned set top box according to the second aspect, the control portion is preferably so formed as to be capable of determining whether or not a copyright protection function preventing unauthorized copying of the digital video signal of the high definition, the resolution of which is converted by the first resolution conversion portion, is effective, and is preferably so formed as to make the digital video output portion output the digital video signal of the low definition having a lower resolution than the video signal of the high definition, the resolution of which is converted by the first resolution conversion portion while being so formed as to be capable of making the first analog video output portion output the analog video signal of the low definition when determining that the copyright protection function is not effective. According to this structure, when the broadcast signal includes the video signal of the high definition and the copyright protection function for the digital video signal is not effective, the video signal of the high definition is not output from either the digital video output portion or the first analog video output portion so that unauthorized copying of the video signal of the high definition through the digital video output portion and the first analog video output portion can be suppressed.

In the aforementioned set top box according to the second aspect, the resolutions of the analog video signal output from the first analog video output portion and the digital video signal output from the digital video output portion are preferably converted by the single first resolution conversion portion. According to this structure, the number of first resolution conversion portions can be reduced, and hence a circuit structure can be simplified, as compared with a case where resolutions of the video signals output from the first analog video output portion and the digital video output portion are converted individually by two first resolution conversion portions.

In the aforementioned set top box according to the second aspect, the first resolution conversion portion is preferably so formed as to selectively convert the resolution of the video signal to either the low definition or the high definition. According to this structure, the first resolution conversion portion selectively converts the resolution of the video signal to either the low definition or the high definition thereby not simultaneously converting the resolution to both the low definition and the high definition. Thus, a load applied to the first resolution conversion portion in converting the resolution can be reduced.

In the aforementioned set top box according to the second aspect, the digital video output portion preferably includes an HDMI connection portion capable of transmitting a signal encrypted by a copyright protection function preventing unauthorized copying of the digital video signal of the high definition between the display and the digital video output portion when the broadcast signal includes the signal for restricting output of the video signal of the high definition and the copyright protection function is effective. According to this structure, copyright of content can be reliably protected by the HDMI connection portion capable of transmitting the signal encrypted by the copyright protection function between the display and the digital video output portion when the broadcast signal includes the signal restricting output of the video signal of the high definition, so that unauthorized copying of the video signal in the form of a video signal of the high definition can be suppressed.

The aforementioned set top box according to the second aspect preferably further comprises a second resolution conversion portion capable of converting the resolution of the video signal based on the broadcast signal to the low definition not to the high definition. According to this structure, the second resolution conversion portion can convert the resolution of the video signal to the low definition independently of the first resolution conversion portion also when the first resolution conversion portion converts the resolution of the video signal to the high definition.

In this case, the aforementioned set top box according to the second aspect preferably further comprises a second analog video output portion connected to the second resolution conversion portion, capable of outputting an analog video signal, a resolution of which is converted to the low definition by the second resolution conversion portion, to the display. According to this structure, the analog video signal can be output from the second analog video output portion independently of the first analog video output portion also when the analog video signal is output from the first analog video output portion.

In the aforementioned set top box according to the second aspect, the display preferably includes a television apparatus, and the control portion is preferably so formed as to be capable of making the first resolution conversion portion convert the video signal to the digital video signal of the high definition and making the digital video output portion output the digital video signal of the high definition when recognizing that connection between the digital video output portion and the television apparatus is in an on-state, also in a case where the broadcast signal includes the signal for restricting output of the video signal of the high definition. According to this structure, a user can watch the digital image of the high definition on the television apparatus while copying of the video signal of the high definition is suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an STB (Set Top Box) 1 according to an embodiment of the present invention is described with reference to FIGS. 1 to 4. This embodiment of the present invention is applied to the STB 1 employed as an exemplary "video signal processing apparatus" of the present invention.

Figure 1:
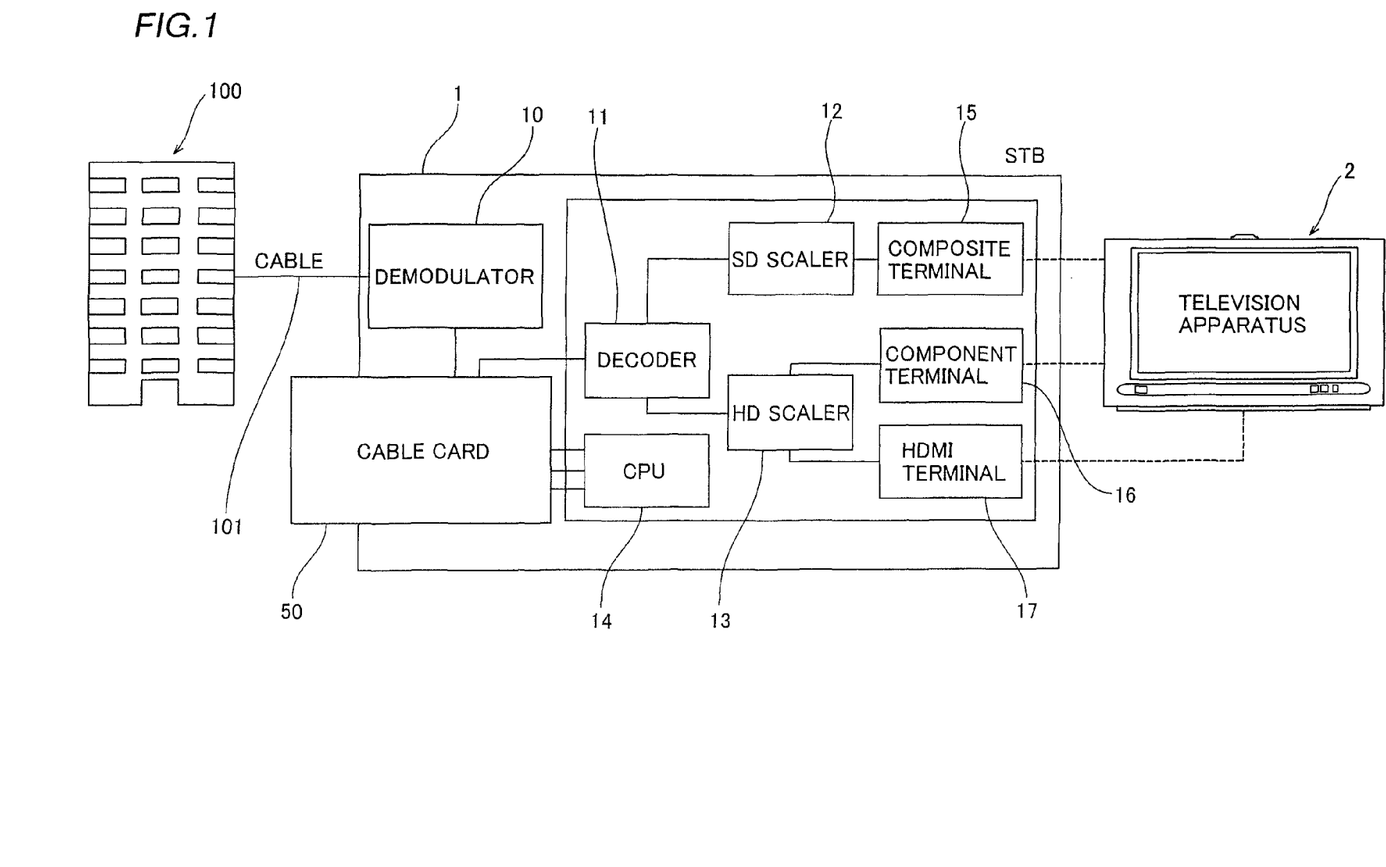
FIG. 1 is a block diagram for illustrating the structure of a set top box and so on according to an embodiment of the present invention.
Figure 2:
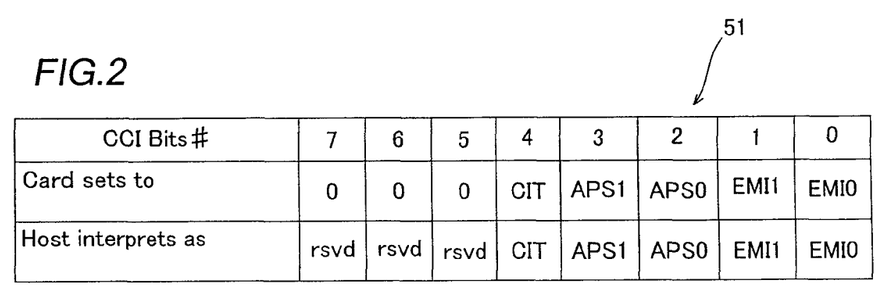
FIG. 2 is a table showing an interpretation of CCI bits received by the set top box shown in FIG. 1.
Figure 3:
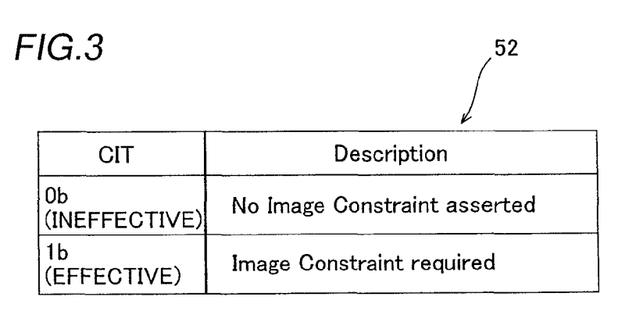
FIG. 3 is a table showing an interpretation of CIT bits included in the CCI bits received by the set top box shown in FIG. 1.

The STB 1 is an apparatus receiving a broadcast signal transmitted from a cable television station 100 through a cable 101 and outputting a video signal generated on the basis of the received broadcast signal to a television apparatus 2 or the like, as shown in FIG. 1. The television apparatus 2 is an example of the "display" in the present invention. The STB 1 is configured such that a cable card 50 assigned by a cable television station 100 company can be inserted. This cable card 50 has a function of releasing a cipher included in a signal called CCI bits (see Table 51 in FIG. 2) included in the broadcast signal transmitted from the cable television station 100.

The CCI bits (see Table 51 in FIG. 2) transmitted from the cable television station 100 include a video signal of high definition (HD) and a signal for restricting output of the video signal of the high definition from the STB 1 of a receiver. This signal included in the CCI bits is called CIT (Constrained Image Trigger) bits (see Table 51 in FIG. 2), and output of an analog video signal of the high definition from a component terminal 16 described later is restricted in a case where the CIT bits are effective (in a case of being 1 b of Table 52 in FIG. 3). In other words, the CIT bit is provided for suppressing unauthorized copying of the video signal having the high definition. On the other hand, the video signal having the high definition can be output without restriction of output of an image in a case where the CIT bits are ineffective (in a case of being 0 b of Table 52 in FIG. 3).

The STB 1 includes a demodulator 10 demodulating the received broadcast signal, a decoder 11 generating the video signal by decoding the encoded broadcast signal, an SD scaler 12 capable of converting the decoded video signal to a video signal of standard definition (SD), an HD scaler 13 capable of converting the decoded video signal to a video signal of each of the standard definition and the high definition and a CPU 14 controlling processing operations of the demodulator 10, the decoder 11, the SD scaler 12, the HD scaler 13 and so on. The SD scaler 12 is an example of the "second resolution conversion portion" in the present invention. The HD scaler 13 is an example of the "first resolution conversion portion" in the present invention, and the CPU 14 is an example of the "control portion" in the present invention. The standard definition (SD) is an example of the "low definition" in the present invention.

According to this embodiment, the STB 1 further includes a composite terminal 15 connected to the SD scaler 12, capable of outputting an analog video signal of the standard definition generated by the conversion of the video signal by the SD scaler 12 to the television apparatus 2 or the like, the component terminal 16 connected to the HD scaler 13, capable of outputting an analog video signal generated by the conversion of the video signal by the HD scaler 13 to the television apparatus 2 or the like and an HDMI® terminal 17 connected to the HD scaler 13 similarly to the component terminal 16, capable of outputting a digital video signal generated by the conversion of the video signal by the HD scaler 13 to the television apparatus 2 or the like. The composite terminal 15 is an example of the "second analog video output portion" in the preset invention. The component terminal 16 is an example of the "first analog video output portion" in the present invention, and the HDMI® terminal 17 is an example of the "digital video output potion" in the present invention.

The SD scaler 12 can convert the video signal to the video signal of the standard definition as hereinabove described. The video signal of the standard definition is a video signal having a resolution of 480i (720×480i).

The HD scaler 13 can convert the video signal to the video signal of the high definition as well as to the video signal of the standard definition. The HD scaler 13 cannot convert the video signal to the video signal of the standard definition when converting the video signal to the video signal of the high definition. The HD scaler 13 cannot convert the video signal to the video signal of the high definition when converting the video signal to the video signal of the standard definition. In other word, the HD scaler 13 of this embodiment cannot simultaneously convert the video signals to both the video signal of the standard definition and the video signal of the high definition. The video signal of the high definition is a video signal having 1080i (1920×1080i). A user can preliminarily set the HD scaler 13 to convert the video signal to the video signal of either the high definition or the standard definition.

Figure 4:
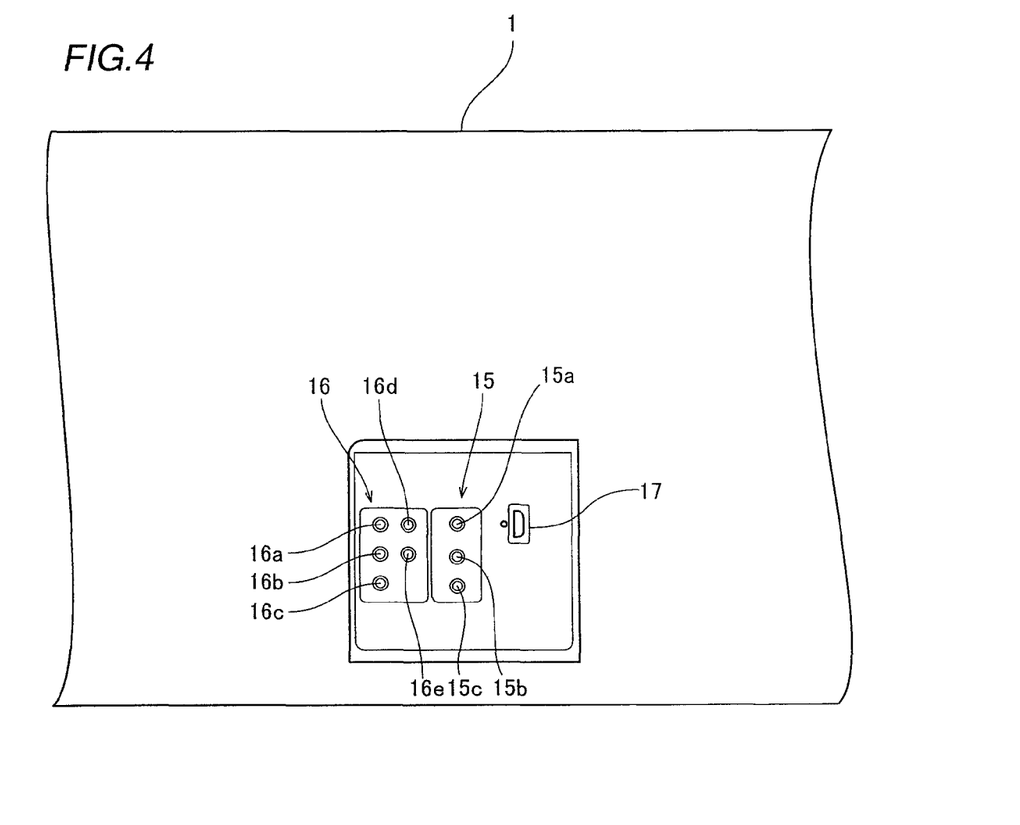
FIG. 4 is a front elevational view for illustrating the structure of terminals provided on the set top box shown in FIG. 1.

The composite terminal 15 is constituted by three pin insert holes 15a, 15b and 15c as shown in FIG. 4. The pin insert holes 15a and 15b are each provided to output analog sound, and the pin insert hole 15c is provided to output an analog image. The composite terminal 15 is so formed as to be capable of outputting only the analog video signal of the standard definition.

The component terminal 16 is constituted by three image pin insert holes 16a, 16b and 16c and two sound pin insert holes 16d and 16e. The image pin insert hole 16a is provided to output a luminance signal included in the analog video signal. The image pin insert holes 16b and 16c are each provided to output a color signal included in the analog video signal. The component terminal 16 can output the analog video signal in a state separated into the three types of signals in this manner thereby being capable of outputting the analog video signal of the high definition.

The HDMI® terminal 17 is so formed as to be capable of outputting the digital video signal. The HDMI® terminal 17 is provided with a plurality of pins (not shown). The HDMI® terminal 17 is so formed as to be capable of transmitting a signal encrypted by employing HDCP (High-bandwidth Digital Content Protection system) as a copyright protection function preventing unauthorized copying of the digital video signal of the high definition between the STB 1 and the television apparatus 2 (see FIG. 1) through any one of the plurality of pins (not shown). The HDMI® terminal 17 has a pin (not shown) capable of transmitting information that connection between the STB 1 and the television apparatus 2 is in an on-state to the CPU 14 (see FIG. 1) of the STB 1 when the connection between the STB 1 and the television apparatus 2 is in an on-state.

According to this embodiment, the video signals output from the component terminal 16 and the HDMI® terminal 17 are both generated by the single HD scaler 13 (see FIG. 1).

According to this embodiment, the CPU 14 is so formed as to make the HD scaler 13 convert the video signal to the video signal of the high definition when recognizing that connection between the HDMI® terminal 17 and the external television apparatus 2 or the like is in an on-state, also in a case where the broadcast signal transmitted from the cable television station 100 includes the CIT bits restricting output of the video signal of the high definition from the component terminal 16, as shown in FIG. 1. Specifically, the CPU 14 is so formed as to make the HD scaler 13 convert the video signal to the video signal of the high definition also when the CIT bits are effective, in a case where the HDCP is effective and the connection between the HDMI® terminal 17 and the television apparatus 2 is in an on-state. According to this embodiment, the digital video signal of the high definition can be output from the HDMI® terminal 17, the connection of which with the external television apparatus 2 is in an on-state in a case where the HDCP is effective and the connection between the HDMI® terminal 17 and the television apparatus 2 is in an on-state. In this case, unauthorized copying of the digital video signal of the high definition through the HDMI® terminal 17 can be suppressed due to the effective HDCP, also when the CIT bits restricting copying are effective.

The CPU 14 has a function of stopping output of the analog video signal from the component terminal 16 when the CIP bits are effective, also in a case where the aforementioned HDCP is effective and the connection between the HDMI® terminal 17 and the television apparatus 2 is in an on-state.

Further, the CPU 14 is so formed as to make the HD scaler 13 covert the broadcast signal to the video signal of the standard definition lower than the high definition when the aforementioned HDCP is ineffective and the connection between the HDMI® terminal 17 and the television apparatus 2 is in an on-state, in a case where the CIT bits are effective. In other words, the CPU 14 is so formed as to make each of the component terminal 16 and the HDMI® terminal 17 output the video signal of the standard definition when the aforementioned HDCP is ineffective and the connection between the HDMI® terminal 17 and the television apparatus 2 is in an on-state, in a case where the CIT bits are effective.

Next, a flow of processing by the CPU 14 for the effective CIT bits of the STB 1 according to this embodiment of the present invention is described with reference to FIGS. 1 and 5.

Figure 5:
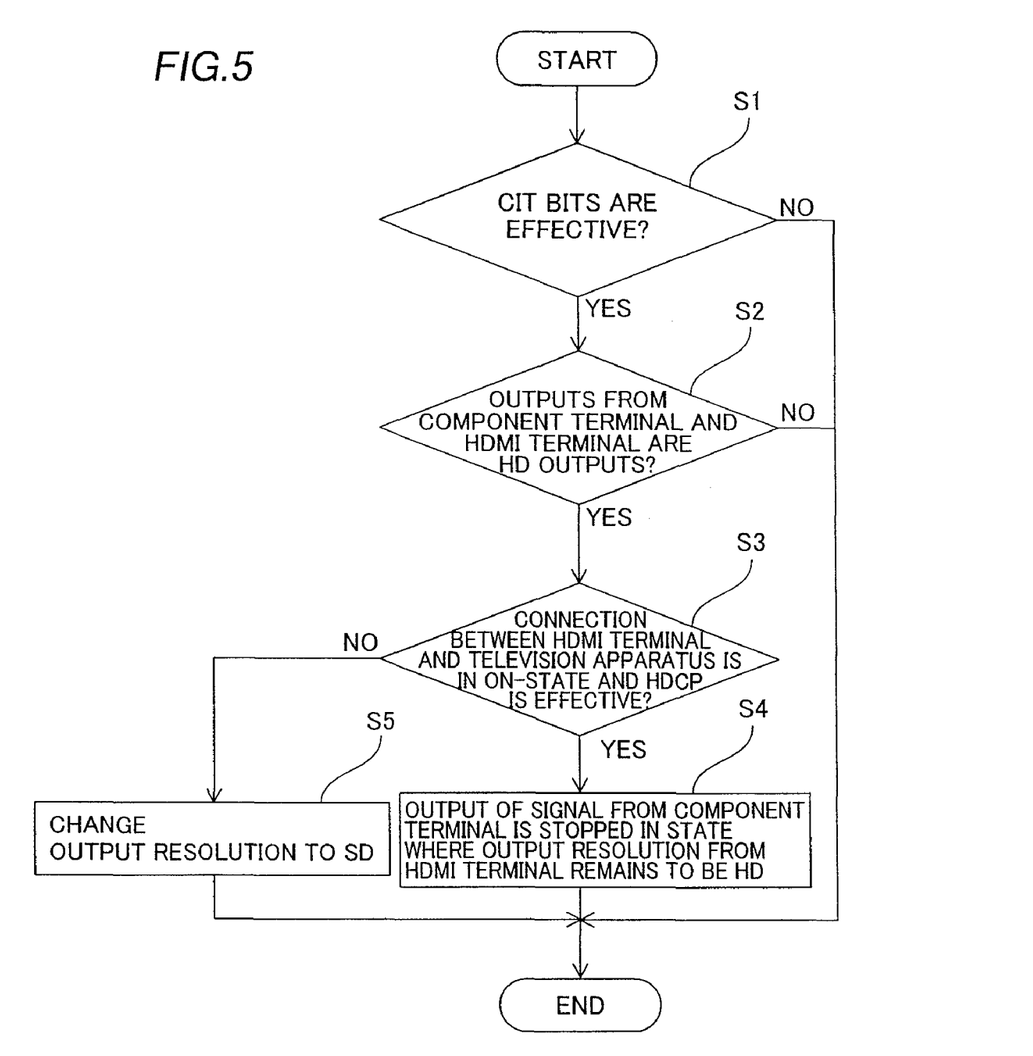
FIG. 5 is a flow chart for illustrating a flow of processing by a CPU for the effective CIT bits of the set top box according to the embodiment of the present invention.

As shown in FIG. 5, the CPU 14 determines whether or not the CIT bits restricting output of the video signal of the high definition included in the broadcast signal transmitted from the cable television station 100 from the component terminal 16 are effective at a step S1. When the CPU 14 determines that the CIT bits are not effective at the step S1, the flow of the processing by the CPU 14 for the effective CIT bits is terminated. When the CPU 14 determines that the CIT bits are effective at the step S1, the process advances to a step S2.

At the step S2, the CPU 14 determines whether or not a user has preliminarily set the HD scaler 13 to convert the video signal to the video signal of the high definition. In other words, the CPU 14 determines whether or not a video signal capable of being output from each of the component terminal 16 and the HDMI® terminal 17 is a video signal of the high definition at the step S2. When the CPU 14 determines that the user has not set the HD scaler 13 to convert the video signal to the video signal of the high definition at the step S2, the flow of the processing by the CPU 14 for the effective CIT bits is terminated. In other words, the video signal of the high definition is not output from either the component terminal 16 or the HDMI® terminal 17 so that the CPU 14 may not performs processing for preventing unauthorized copying. In this case, the analog and digital video signals of the standard definition are output from the component terminal 16 and the HDMI® terminal 17, respectively so that the user can watch an image of the standard definition on the television apparatus 2. When the CPU 14 determines that the user has set the HD scaler 13 to convert the video signal to the video signal of the high definition at the step S2, the process advances to a step S3.

The CPU 14 recognizes whether or not the connection between the HDMI® terminal 17 and the television apparatus 2 is in an on-state and determines whether or not the HDCP, which is a copyright protection function preventing unauthorized copying of the digital video signal of digital high definition, is effective at the step S3. When the CPU 14 recognizes that the connection between the HDMI® terminal 17 and the television apparatus 2 is in an on-state and determines that the HDCP is effective at the step S3, the process advances to a step S4. At the step S4, the video signal is output from the HDMI® terminal 17 in a state where the resolution of the video signal converted by the HD scaler 13 remains to be the high definition. In other words, the HDCP is effective, so that an unauthorized copy of the digital video signal of the high definition cannot be made also when the digital video signal output from the HDMI® terminal 17 is of the high definition. Further, output of the analog video signal from the component terminal 16 is stopped at the step S4. In other word, the digital video signal of the high definition is generated by the HD scaler 13 to be output from the HDMI® terminal 17 as hereinabove described, so that the video signal of the high definition is output also from the component 16. Thus, output of the video signal from the component terminal 16 is stopped at the step S4, as hereinabove described. After the step S4, the flow of the processing by the CPU 14 for the effective CIT bits is terminated.

When the CPU 14 recognizes that the connection between the HDMI® terminal 17 and the television apparatus 2 is in an on-state and determines that the HDCP is ineffective or the CPU 14 recognizes that the connection between the HDMI® terminal 17 and the television apparatus 2 is not in an on-state and determines that the HDCP is effective or ineffective at the step S3, the process advances to a step S5. At the step S5, the resolution of the video signal converted by the HD scaler 13 is changed to the standard definition.

In other words, when the CPU 14 does not recognize that the connection between the HDMI® terminal 17 and the television apparatus 2 is in an on-state, the STB 1 may be connected to an unauthorized device through the HDMI® terminal 17. In this case, an unauthorized copy of the video signal of the high definition may be made. Alternatively, the STB 1 may be connected to the television apparatus 2 or the unauthorized device through the component terminal 16. Also in this case, an unauthorized copy of the video signal of the high definition may be made. Also in a case where the CPU 14 recognizes that the connection between the HDMI® terminal 17 and the television apparatus 2 is in an on-state, an unauthorized copy of the video signal of the high definition may be easily made through the HDMI® terminal 17 when the HDCP is ineffective. Alternatively, an unauthorized copy of the video signal of the high definition may be easily made through the component terminal 16. Therefore, the HD scaler 13 is so formed as to convert the video signal to the video signal of the standard definition not of the high definition in these cases. After the step S5, the flow of the processing by the CPU 14 for the effective CIT bits is terminated.

According to this embodiment, as hereinabove described, the CPU 14 is so formed as to be capable of making the HD scaler 13 convert the video signal to the video signal of the high definition and of making the HDMI® terminal 17 output the digital video signal of the high definition when recognizing that the connection between the HDMI® terminal 17 and the television apparatus 2 is in an on-state, also in a case where the broadcast signal includes the signal (CIT bits) for restricting output of the video signal of the high definition, whereby the video signal of the high definition can be output from the HDMI® terminal 17 also when output of the analog video signal of the high definition from the component terminal 16 is restricted. Thus, a user makes the connection between the HDMI® terminal 17 and the television apparatus 2 or the like in an on-state, thereby being capable of watching an image of the high definition. When the broadcast signal includes the signal for restricting output of the video signal of the high definition from the component terminal 16, the video signal of the high definition is not output from the component terminal 16 so that copying of the video signal of the high definition through the component terminal 16 can be suppressed. Thus, a user can watch a digital image of the high definition while copying of the video signal of the high definition is suppressed.

According to this embodiment, as hereinabove described, the CPU 14 can determine whether or not the copyright protection function (HDCP) preventing unauthorized copying of the video signal of the high definition generated by the conversion of the video signal by the HD scaler 13 is effective, and when the HDCP is effective, the CPU 14 makes the HDMI® terminal 17 output the video signal of the high definition, whereby the video signal of the high definition can be output from the HDMI® terminal 17 only when data in which the HDCP prevents unauthorized copying of the video signal of the high definition is recognized, and hence unauthorized copying of the digital video signal of the high definition through the HDMI® terminal 17 can be suppressed.

According to this embodiment, as hereinabove described, the CPU 14 can determine whether or not the copyright protection function (HDCP) preventing unauthorized copying of the video signal of the high definition included in the received broadcast signal and generated by the conversion of the video signal by the HD scaler 13 is effective, and when the HDCP is effective, the CPU 14 stops output of the video signal from the component terminal 16, whereby unauthorized copying of the analog video signal of the high definition through the component terminal 16 can be easily suppressed while a user watches an image based on the digital video signal of the high definition.

According to this embodiment, as hereinabove described, when the HDCP is ineffective, the CPU 14 is so formed as to make the HDMI® terminal 17 output the video signal of the standard definition having a lower resolution than the video signal of the high definition generated by the conversion of the video signal by the HD scaler 13 and to be capable of making the component terminal 16 output the video signal of low definition, whereby when the broadcast signal includes the video signal of the high definition and the copyright protection function for the digital video signal is not effective, the video signal of the high definition is not output from either the HDMI® terminal 17 or the component terminal 16 so that unauthorized copying of the video signal of the high definition through the HDMI® terminal 17 and the component terminal 16 can be suppressed.

According to this embodiment, as hereinabove described, the video signals output from the component terminal 16 and the HDMI® terminal 17 are converted by the single HD scaler 13, whereby the number of HD scalers can be reduced, and hence a circuit structure can be simplified, as compared with a case where resolutions of the video signals output from the component terminal 16 and the HDMI® terminal 17 are converted individually by two HD scalers.

According to the aforementioned embodiment, the signal (CIT bits) for restricting output of the video signal of the high definition is included in the broadcast signal (CCI bits) transmitted from the cable television station 100, whereby output of a transmission signal transmitted from the cable television station 100 in the form of a video signal of the high definition is restricted so that unauthorized copying of the transmission signal transmitted from the cable television station 100 in the form of a video signal of the high definition can be suppressed.

According to the aforementioned embodiment, the HD scaler 13 is so formed as to selectively convert the resolution to either the standard definition or the high definition thereby selectively converting the resolution to either the standard definition or the high definition, and hence the HD scaler 13 does not simultaneously convert the resolution to both the standard definition and the high definition. Thus, a load applied to the HD scaler 13 in converting the resolution can be reduced.

According to the aforementioned embodiment, the HDMI® terminal 17 capable of transmitting the signal encrypted by the copyright protection function (HDCP) between the STB 1 and the television apparatus 2 is provided when the broadcast signal (CCI bits) includes the signal (CIT bits) restricting output of the video signal of the high definition and the copyright protection function (HDCP) preventing unauthorized copying of the video signal of the high definition is effective, whereby copyright of content can be reliably protected by the HDMI® terminal 17 capable of transmitting the signal encrypted by the copyright protection function (HDCP) between the STB 1 and the television apparatus 2 when the broadcast signal (CCI bits) includes the signal (CIT bits) restricting output of the video signal of the high definition, so that unauthorized copying of the video signal in the form of a video signal of the high definition can be suppressed.

According to the aforementioned embodiment, the SD scaler 12 capable of converting the resolution of the video signal based on the broadcast signal to the standard definition not to the high definition is provided, whereby the SD scaler 12 can convert the resolution of the video signal to the standard definition independently of the HD scaler 13 also when the HD scaler 13 converts the resolution of the video signal to the high definition.

According to the aforementioned embodiment, the composite terminal 15 connected to the SD scaler 12, capable of outputting the analog video signal, the resolution of which was converted to the standard definition by the SD scaler 12, to the television apparatus 2 is provided, whereby the analog video signal can be output from the composite terminal 15 independently of the component terminal 16 also when the analog video signal is output from the component terminal 16.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the STB (Set Top Box) 1, employed as an exemplary video signal processing apparatus in the present invention, the present invention is not restricted to this but may alternatively be applied to another video signal processing apparatus other than the television apparatus and the STB such as a DVD recorder, for example.

While the HDMI® terminal is employed as an exemplary digital video output portion in the aforementioned embodiment, the present invention is not restricted to this but another digital video output portion other than the HDMI® terminal, such as a DVI (Digital Visual Interface) may alternatively be employed, for example, so far as the digital video output portion is a terminal capable of outputting a digital image.

While the CIT bits are employed as an exemplary signal for restricting output of the video signal of the high definition from the first analog video output portion in the aforementioned embodiment, the present invention is not restricted to this but another signal for restricting output of the video signal of the high definition from the first analog video output portion other than the CIT bits may alternatively be employed.

While the HDCP is employed as an exemplary copyright protection function preventing unauthorized copying of the video signal of the high definition in the aforementioned embodiment, the present invention is not restricted to this but another copyright protection function preventing unauthorized copying of the video signal of the high definition other than the HDCP, such as a DTCP (Digital Transmission Content Protection) may alternatively be employed, for example.

What is claimed is:

1. A video signal processing apparatus comprising:
    a receiving portion that receives a broadcast signal from a cable television station;
    a first resolution conversion portion, connected to the receiving portion, that selectively converts a resolution of a video signal based on said broadcast signal to both low definition and high definition;
    a first analog video output portion, directly connected to said first resolution conversion portion that outputs an analog video signal, a resolution of which is converted by said first resolution conversion portion, to a display;
    a second resolution conversion portion that converts the resolution of said video signal based on said broadcast signal to only low definition, and outputs the converted low definition to the display, wherein the second resolution conversion portion is separate from the first resolution conversion portion;
    a digital video output portion includes a High-Definition Multimedia Interface (HDMI) connection portion directly connected to said first resolution conversion portion, the HDMI outputs a digital video signal, a resolution of which is converted by said first resolution conversion portion, to said display; and
    a control portion that determines whether or not connection between said digital video output portion and said display is in an on-state,
    the control portion further determines whether the broadcast signal includes a signal for restricting output of the video signal of high definition, wherein
    said control portion controls said first resolution conversion portion to convert said video signal to said digital video signal of said high definition and controls said digital video output portion to output said digital video signal of said high definition in response to determining by the control portion that the connection between said digital video output portion and said display is in an on-state and said broadcast signal includes the signal for restricting output of said video signal of said high definition and copyright protection function is effective, wherein the signal for restricting output of said video signal of said high definition is included in Copy Control Information (CCI) bits transmitted in the broadcast signal.

2. The video signal processing apparatus according to claim 1, wherein said control portion determines whether or not the copyright protection function preventing unauthorized copying of said digital video signal of said high definition, the resolution of which is converted by said first resolution conversion portion, is effective.

3. The video signal processing apparatus according to claim 1, wherein said control portion determines whether or not the copyright protection function preventing unauthorized copying of said digital video signal of said high definition, the resolution of which is converted by said first resolution conversion portion, is effective and stops output of said analog video signal from said first analog video output portion when determining that said copyright protection function is effective.

4. The video signal processing apparatus according to claim 1, wherein said control portion determines whether or not the copyright protection function preventing unauthorized copying of said digital video signal of said high definition, the resolution of which is converted by said first resolution conversion portion, is effective, and makes said digital video output portion output said digital video signal of said low definition having a lower resolution than said video signal of said high definition, the resolution of which is converted by said first resolution conversion portion while making said first analog video output portion output said analog video signal of said low definition when determining that said copyright protection function is not effective.

5. The video signal processing apparatus according to claim 1, wherein
    the resolutions of said analog video signal output from said first analog video output portion and said digital video signal output from said digital video output portion are converted by single said first resolution conversion portion.

6. The video signal processing apparatus according to claim 1, wherein said digital video output portion includes the HDMI connection portion capable of transmitting a signal encrypted by a copyright protection function preventing unauthorized copying of said digital video signal of said high definition between said display and said digital video output portion when said broadcast signal includes said signal for restricting output of said video signal of said high definition and said copyright protection function is effective.

7. The video signal processing apparatus according to claim 1, further comprising a second analog video output portion connected to said second resolution conversion portion, that outputs an analog video signal, a resolution of which is converted to said low definition by said second resolution conversion portion, to said display.

8. A set top box comprising:
   a receiving portion that receives a broadcast signal from a cable television station;
   a first resolution conversion portion, connected to the receiving portion, that selectively converts a resolution of a video signal based on said broadcast signal transmitted from the cable television station to both low definition and high definition on the basis of said broadcast signal;
   a first analog video output portion, directly connected to said first resolution conversion portion, that outputs an analog video signal, a resolution of which is converted by said first resolution conversion portion, to a display;
   a second resolution conversion portion that converts the resolution of said video signal based on said broadcast signal to only low definition, and outputs the converted low definition to the display, wherein the second resolution conversion portion is separate from the first resolution conversion portion;
   a digital video output portion includes a High-Definition Multimedia Interface (HDMI) connection portion directly connected to said first resolution conversion portion, the HDMI outputs a digital video signal, a resolution of which is converted by said first resolution conversion portion, to said display; and
   a control portion that determines whether or not connection between said digital video output portion and said display is in an on-state,
   the control portion further determines whether the broadcast signal includes a signal for restricting output of the video signal of high definition, wherein
   said control portion controls said first resolution conversion portion to convert said video signal to said digital video signal of said high definition and controls said digital video output portion to output said digital video signal of said high definition in response to determining by the control portion that the connection between said digital video output portion and said display is in an on-state and said broadcast signal includes the signal for restricting output of said video signal of said high definition and copyright protection function is effective, wherein the signal for restricting output of said video signal of said high definition is included in Copy Control Information (CCI) bits transmitted in the broadcast signal.

9. The set top box according to claim 8, wherein
said control portion determines whether or not the copyright protection function preventing unauthorized copying of said digital video signal of said high definition, the resolution of which is converted by said first resolution conversion portion, is effective.

10. The set top box according to claim 8, wherein
said control portion determines whether or not the copyright protection function preventing unauthorized copying of said digital video signal of said high definition, the resolution of which is converted by said first resolution conversion portion, is effective and stops output of said analog video signal from said first analog video output portion when determining that said copyright protection function is effective.

11. The set top box according to claim 8, wherein
said control portion determines whether or not the copyright protection function preventing unauthorized copying of said digital video signal of said high definition, the resolution of which is converted by said first resolution conversion portion, is effective, and makes said digital video output portion output said digital video signal of said low definition having a lower resolution than said video signal of said high definition, the resolution of which is converted by said first resolution conversion portion while making said first analog video output portion output said analog video signal of said low definition when determining that said copyright protection function is not effective.

12. The set top box according to claim 8, wherein
the resolutions of said analog video signal output from said first analog video output portion and said digital video signal output from said digital video output portion are converted by single said first resolution conversion portion.

13. The set top box according to claim 8, wherein
said digital video output portion includes the HDMI connection portion capable of transmitting a signal encrypted by a copyright protection function preventing unauthorized copying of said digital video signal of said high definition between said display and said digital video output portion when said broadcast signal includes said signal for restricting output of said video signal of said high definition and said copyright protection function is effective.

14. The set top box according to claim 8, further comprising a second analog video output portion connected to said second resolution conversion portion, that outputs an analog video signal, a resolution of which is converted to said low definition by said second resolution conversion portion, to said display.

15. The set top box according to claim 8, wherein
said display includes a television apparatus, and
said control portion controls said first resolution conversion portion to convert said video signal to said digital video signal of said high definition and controls said digital video output portion to output said digital video signal of said high definition in response to determining by the control portion that connection between said digital video output portion and said television apparatus is in an on-state and said broadcast signal includes said signal for restricting output of said video signal of said high definition and said copyright protection function is effective.

* * * * *